(12) United States Patent
Ferren et al.

(10) Patent No.: US 11,265,703 B2
(45) Date of Patent: Mar. 1, 2022

(54) METHOD AND APPARATUS FOR PROTECTING DATA IN A PORTABLE ELECTRONIC DEVICE

(71) Applicant: Applied Minds, LLC, Burbank, CA (US)

(72) Inventors: Bran Ferren, Beverly Hills, CA (US); W. Daniel Hillis, Toluca Lake, CA (US)

(73) Assignee: Applied Minds, LLC, Burbank, CA (US)

( * ) Notice: Subject to any disclaimer, the term of this patent is extended or adjusted under 35 U.S.C. 154(b) by 0 days.

(21) Appl. No.: 16/719,407

(22) Filed: Dec. 18, 2019

(65) Prior Publication Data

US 2020/0162902 A1 May 21, 2020

Related U.S. Application Data

(63) Continuation of application No. 15/927,351, filed on Mar. 21, 2018, now Pat. No. 10,536,847, which is a
(Continued)

(51) Int. Cl.
*H04W 12/02* (2009.01)
*G08B 13/14* (2006.01)
(Continued)

(52) U.S. Cl.
CPC ............ *H04W 12/02* (2013.01); *G06F 21/32* (2013.01); *G06F 21/60* (2013.01); *G06F 21/6245* (2013.01); *G06F 21/88* (2013.01); *G08B 13/1409* (2013.01); *H04L 9/08* (2013.01); *H04L 63/06* (2013.01); *H04L 63/083* (2013.01); *H04L 63/107* (2013.01); *H04W 12/04* (2013.01); *H04W 12/06* (2013.01); *H04W 12/08* (2013.01); *H04W 12/082* (2021.01);
(Continued)

(58) Field of Classification Search
None
See application file for complete search history.

(56) References Cited

U.S. PATENT DOCUMENTS 6,983,378 B1  1/2006  Kokubo
2005/0073389 A1*  4/2005  Chandley .............. G06F 21/554
340/5.31
(Continued)

FOREIGN PATENT DOCUMENTS

WO    97/38521    10/1997

*Primary Examiner* — Brandon S Hoffman
(74) *Attorney, Agent, or Firm* — Perkins Coie LLP; Michael A. Glenn

(57) ABSTRACT

Data in a portable electronic device is protected by using external and internal status detection means to determine if the device is misplaced, lost, or stolen. The device then takes, singly or in combination, one of several actions to protect the data on the device, including declaring its location to an owner or service provider, locking the device or specific functions of the device to disable all data retrieval functionality, erasing or overwriting all the stored data in the device or, where the data has been stored in the device in an encrypted format, destroying an internally-stored encryption key, thereby preventing unauthorized access to the encrypted data in the device.

20 Claims, 3 Drawing Sheets

Related U.S. Application Data continuation of application No. 15/343,819, filed on Nov. 4, 2016, now Pat. No. 9,961,541, which is a continuation of application No. 14/490,436, filed on Sep. 18, 2014, now Pat. No. 9,519,808, which is a continuation of application No. 13/269,496, filed on Oct. 7, 2011, now Pat. No. 8,870,971, which is a continuation of application No. 11/832,900, filed on Aug. 2, 2007, now Pat. No. 8,038,722.

(60) Provisional application No. 60/821,235, filed on Aug. 2, 2006.

(51) Int. Cl.
*H04L 9/08* (2006.01)
*H04W 12/082* (2021.01)
*H04W 12/126* (2021.01)
*G06F 21/88* (2013.01)
*G06F 21/32* (2013.01)
*G06F 21/60* (2013.01)
*H04W 12/12* (2021.01)
*G06F 21/62* (2013.01)
*H04L 29/06* (2006.01)
*H04W 12/04* (2021.01)
*H04W 12/06* (2021.01)
*H04W 12/08* (2021.01)

(52) U.S. Cl.
CPC ......... *H04W 12/12* (2013.01); *H04W 12/126* (2021.01); *G06F 2221/2143* (2013.01); *H04L 2209/80* (2013.01)

(56) References Cited

U.S. PATENT DOCUMENTS

| 2006/0021006 | A1 | 1/2006 | Rensin et al. | |
| 2006/0112418 | A1* | 5/2006 | Bantz | H04L 63/102 726/4 |
| 2006/0145839 | A1 | 7/2006 | Sandage | |
| 2007/0294529 | A1* | 12/2007 | Blair | G06F 21/88 713/160 |

* cited by examiner

METHOD AND APPARATUS FOR PROTECTING DATA IN A PORTABLE ELECTRONIC DEVICE

CROSS REFERENCE TO RELATED APPLICATIONS

This application is a continuation of and claims priority to U.S. patent application Ser. No. 15/927,351, filed Mar. 21, 2018, which issued as U.S. Pat. No. 10,536,847 on Jan. 14, 2020, which is a continuation of and claims priority to U.S. patent application Ser. No. 15/343,819, filed Nov. 4, 2016, which issued as U.S. Pat. No. 9,961,541 on May 1, 2018, which is a continuation of and claims priority to U.S. patent application Ser. No. 14/490,436, filed Sep. 18, 2014 which issued as U.S. Pat. No. 9,519,808 on Dec. 13, 2016, which is a continuation of and claims priority to U.S. patent application Ser. No. 13/269,496, filed Oct. 7, 2011, which issued as U.S. Pat. No. 8,870,971 on Oct. 28, 2014, which is a continuation of and claims priority to U.S. patent application Ser. No. 11/832,900, filed Aug. 2, 2007, which issued as U.S. Pat. No. 8,038,722 on Oct. 18, 2011, which application claims priority to U.S. provisional patent application Ser. No. 60/821,235, filed Aug. 2, 2006, this application is also related to PCT patent application serial no. PCT/US08/71135, filed Jul. 25, 2008, which application claims priority to U.S. patent application Ser. No. 11/832,900, filed Aug. 2, 2007, which applications are each incorporated herein in their entirety by this reference thereto.

BACKGROUND OF THE INVENTION

Technical Field

The invention relates to portable electronic devices, and in particular to a system and methods for protecting and safeguarding the privacy of information and data stored on such devices.

Discussion of the Prior Art

Portable electronic devices, including cell phones, wireless devices, iPods, PDA's and handheld devices, among others, have become ubiquitous in society and are seeing continually increasing widespread use. An October 2004 survey by the Pew Research Center for The People and The Press estimated that 66% of American adults own cell phones. The use of more fully featured portable electronic devices has also become more commonplace.

In response to this increasing usage, designers of portable electronic devices are offering increased functionality, and users are storing an ever-larger volume of private data on the devices. Most portable electronic device users store contact information on the device, and, many users additionally store materials such as confidential communications and proprietary documents. Storage of sensitive data is particularly prevalent in the business community, with some analysts estimating that in the near future as much as 40 percent of corporate data will reside on handheld devices.

As the ability to send, receive, and store data has increased, the risk posed by the potential loss of the data has increased accordingly. The consequences of data falling into the hands of a stranger should a device be lost, temporarily misplaced or stolen are particularly severe.

It is not unusual for persons to lose or misplace their portable electronic devices. Frequently, persons fail to ever recover the device since they cannot determine where and when they actually misplaced the device, or, whether it was stolen. For example, a person might leave the device in the back seat of a cab or in the booth of a restaurant at lunch. Perhaps the device falls out of a jacket or briefcase in an overhead compartment on an airplane. Further, and creating significant embarrassment, one might leave the device at a client's office. Still further, a car might be vandalized and a cell phone stolen. Whatever the case may be, it is quite likely that most people will lose or temporarily misplace their portable electronic device each year. Research shows that 65 percent of Americans lost their cell phones last year—and it cost $600 million to replace them.

Losing a phone due to absentmindedness is not just frustrating, though. It also causes great anxiety in the IT departments of many major corporations, because, these days, mobile phones are so powerful that most of them are mini-PCs, containing customer information, phone numbers and pricing schedules. Consequently, a lost phone or PDA may mean a data breach these days, as e-mail isn't the only application found on the devices. More mobile applications are being developed to complement e-mail, such as CRM (customer resource management) and ERP (enterprise resource planning) to make mobility and the deployment of mobile devices even more valuable for the enterprise.

One approach to safeguarding private data is storage of data at a central location. Many portable electronic devices provide an ability to 'synchronize' data stored on the device with data stored on a personal computer. Some wireless providers also provide centralized storage of personal data. For example, the OASYS "VIRTUAL LOCKER" (http://store.oasysmobile.com/common/about-the-locker) stores subscriber data at a centralized server. The service offers protection against the nuisance of recreating the lost data in the event of a lost device, and ensures portability of data across future device upgrades. Such approaches, however, do little to safeguard the data cached locally on the portable electronic device, and, in the latter case, the security of the data is blindly entrusted to a third party.

For the foregoing reasons, there is a need for a novel portable electronic device data protection system and methods to confidently protect data stored locally in the device that can be implemented by the owner of the device, the device service provider, or, by the device itself.

SUMMARY OF THE INVENTION

A method and apparatus for protecting data on a lost portable electronic device is discussed, in which external or internal status detection means are used to determine if the device is misplaced, lost, or stolen. The device then takes one or more actions to protect the data on the device, including declaring its location to an owner or service provider, locking the device or specific functions of the device to disable all data retrieval functionality, erasing the stored data in the device or, where the data has been stored in the device in an encrypted format, destroying an internally-stored encryption key, thereby preventing unauthorized access to the encrypted data in the device.

A preferred embodiment of the invention comprises an application, embodied as software or firmware and operating on a portable electronic device, which determines that the portable electronic device is misplaced, lost, or stolen, and that then takes action to safeguard the data stored on the portable electronic device. In a preferred embodiment of the invention, the owner of the device explicitly indicates to the device that it is lost or stolen. In the case of a portable electronic device having cellular phone functionality, the owner may call the device directly and enter a predetermined code that notifies the device that it is lost or stolen. Also in the preferred embodiment of the invention, the device writes data to its internal storage during normal operation in an encrypted format. The device caches the data encryption key within the internal storage of the device during ordinary usage. When it is determined that the device is lost or stolen, the device destroys the encryption key. The owner may then later restore access to the data by providing the encryption key to the device.

DETAILED DESCRIPTION OF A PREFERRED EMBODIMENT

Figure 1:
FIG. 1 is a flow chart illustrating the basic operation of an embodiment of the invention.

In a preferred embodiment, the invention comprises an application operating on a portable electronic device that (1) determines that the portable electronic device is misplaced, lost or stolen, and (2) takes action to safeguard the data stored on the portable electronic device. Many embodiments of the invention are possible, based on different techniques for achieving each of the aforementioned functions.

To determine that it is misplaced, lost or stolen, i.e., has an undesirable status, the portable electronic device uses one of several techniques. For purposes herein, the terms, "undesirable status," "misplaced, lost, or stolen," and "lost or stolen" are used in a generic sense to indicate that the portable electronic device is not under control of the owner/user, and therefore, the owner/user is interested protecting the data in the device from access by unauthorized persons.

In the preferred embodiment of the invention, the device receives from the owner an indication that it is misplaced, lost or stolen. For example, in the case of a portable electronic device having cellular phone functionality, the owner may call the device directly and enter a predetermined code that notifies the device that it is lost or stolen. In the case of a portable electronic device that does not have cellular phone functionality, the owner may call a service number operated by the service provider, and the service provider then transmits an appropriate signal to the device using other communication protocols, including other wireless communication systems or landline and network systems.

In an alternative embodiment of the invention, the portable electronic device itself detects that it is misplaced, lost, or stolen. For example, the device may detect that it is misplaced, lost, or stolen based on its current position. The owner of the device defines a region within which he intends to operate the device. If the device leaves the defined region, the device assumes that is has been misplaced, lost, or stolen. An embedded GPS unit, wireless triangulation, or time-of-flight calculations may calculate the position of the device. Alternatively, in areas where service coverage is ordinarily reliable, loss of signal alone may indicate that the device has departed from the intended usage area. The device observes its position and triggers various actions for data protection based upon predetermined location parameters.

Another technique that the portable electronic device may use to detect that it is misplaced, lost, or stolen is observation of a prolonged period of inactivity or activity. For example, in a device with cellular phone functionality, the device may compare the elapsed time since the owner last placed a call to a threshold value set by the manufacturer or the owner and, depending on the result of the comparison, elect to trigger certain data protection functions. The device observes its own activity levels and triggers various actions for data protection based upon predetermined activity levels.

In yet another technique, a device having cellular phone functionality monitors the phone numbers dialed, and compares them with either or both of a history of previously dialed numbers and numbers within the internally stored contact information. The device observes dialing patterns and triggers various actions for data protection based upon any predetermined events or anomalous dialing patterns.

Finally, the device may combine two or more of the above techniques to provide a more sophisticated determination of when it has been misplaced, lost, or stolen.

Once the device determines that it is likely misplaced, lost, or stolen, the device may take one or more of several actions, each providing an additional level of security. In one embodiment of the invention, the device enters a beacon mode in which it transmits its location. For example, if the device is equipped with a GPS unit, it may transmit its location to a central server operated by the service provider. The owner of the device may then access the location of the device, e.g. via a web page that adequately authenticates the identity of the owner. Alternatively, the portable electronic device may call a predetermined number, e.g. the land line of the owner, and report, e.g. with a synthesized voice—its current location to either a message recorder or directly to the owner.

In another embodiment of the invention, the portable electronic device provides a higher level of protection by entering a non-functional lock-down mode after determining it is misplaced, lost, or stolen. Once in lock-down mode, the device does not allow data retrieval therefrom. The device returns to full operation only when the owner can be reliably authenticated, for example via a predetermined password or biometric identification.

However, as a skilled hacker may still defeat the authentication process, the preferred embodiment of the invention provides an even higher level of security. In a preferred embodiment of the invention, during normal operation the device writes data to the internal storage in an encrypted format. The device caches the encryption key within the storage during ordinary usage, so that the encryption and decryption processes do not inconvenience the user. When it is determined that the device is misplaced, lost, or stolen, the device destroys the encryption key. The owner may restore access to the data by providing the encryption key, which he has presumably recorded in a safe location.

In yet another embodiment of the invention, the portable electronic device completely erases the contents of its on board data storage. If the storage incorporates volatile memory, the device may cut the power to the memory. If the storage incorporates non-volatile memory, the device may overwrite the data, preferably multiple times. The device may use a file utility such as "GNU SHRED" to perform the overwriting. While providing essentially complete security, this approach does prevent direct recovery of the data by the owner.

In a further embodiment of the invention, the portable electronic device implements the actions described above in sequence, entering beacon mode immediately upon determination that it is misplaced, lost, or stolen. If more time passes before the owner recovers the device, the remaining actions are undertaken in sequence, with each action providing and increased level of security.

As illustrated in FIG. 1, a preferred embodiment of, the invention comprises a method and apparatus for protecting data in a portable electronic device. The invention further comprises method comprising a first step 100 of determining that the device is misplaced, lost, or stolen; and a second step 200 of protecting the data stored in the device. A portable electronic device can include any such device which has data storage and the ability to send and receive communications or to automatically act on indicators of status and trigger actions to protect data on the device whenever a certain status has developed. Portable electronic devices include cell phones, pagers, PDA's, memory sticks, portable hard drives, iPod's, MP3 players, and any other such device which is mobile, stores data for its user, and includes sufficient memory and logic to implement the functions of the invention.

Figure 2:
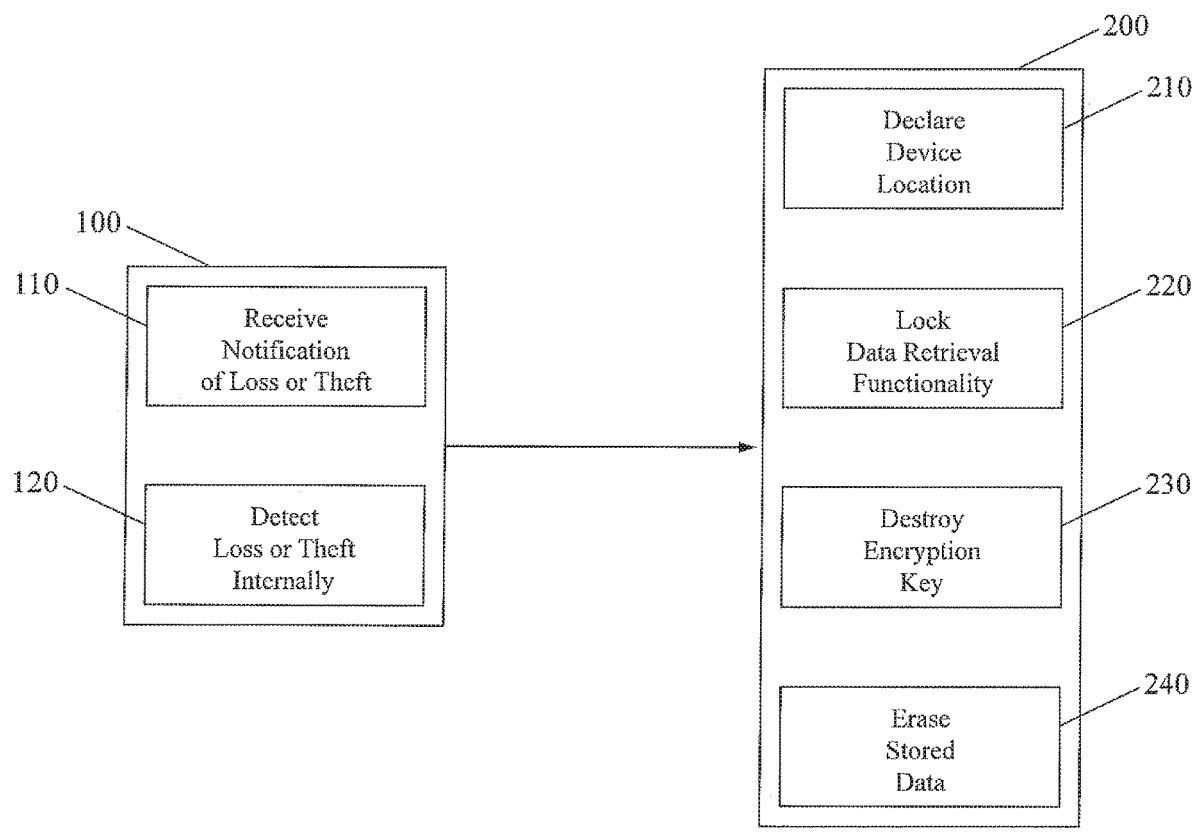
FIG. 2 is an expanded flow chart derivative of the flow chart in FIG. 1 illustrating the operation of several embodiments of the invention.

FIG. 2 is a more detailed diagram that shows a procedure for determining that the device is lost or stolen 100 and that may be accomplished by the device either (1) receiving external notification 110 of the loss or theft or (2) using internal means 120 to detect loss or theft.

In FIG. 2, to implement the step of protecting stored data 200, the invention may employ several different approaches, either singly or in combination, as follows. First, the device may declare its location 210. Second, the device may lock data retrieval functionality 220. Third, where data on the device has been encrypted, the device may destroy an encryption key 230, thereby preventing unauthorized access to the data. Fourth, the device may erase the stored data 240.

Figure 3:
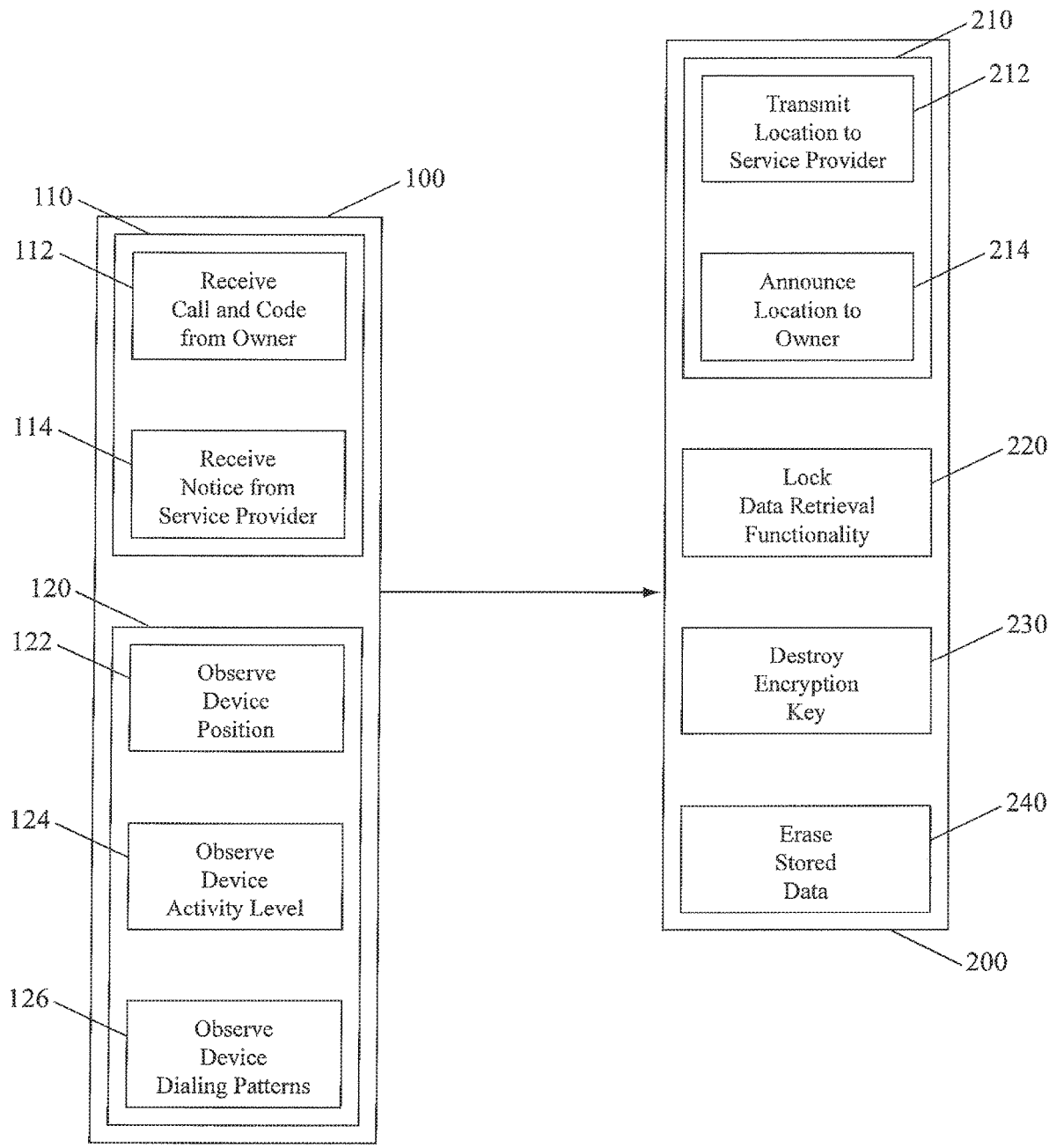
FIG. 3 is a further expanded flow chart derivative of the flow chart in FIG. 2 illustrating the operation of additional embodiments of the invention.

As illustrated in FIG. 3, the invention may employ additional status detection 100 and data protection 200 means. Where certain means are described in a singular fashion, the invention provides that any of the means may be used either singly or in combination. First, the device may receive a call and code from its owner 112 to alert the device that it is lost or stolen. Either singly or in combination with a call from an owner 112, the device may also receive notice communicated directly from a service provider 114. Either singly or in combination, the device may also use its own internal status detection means including observing its position 122, observing device activity levels 124 or observing dialing patterns on the device 126, among other things.

Further, in response to the determination that the device has been misplaced, lost, or stolen, to protect its stored data, either singly or in combination, the device can declare its location 210 by transmitting its location to a service provider 212 or by announcing its location to an owner 214. The device may announce its location to an owner 214 using several different approaches, either singly or in combination, including: triggering an automated call to the owner on another designated number, triggering an instant message to the owner, sending an email to the owner, paging the owner on another designated number, sounding an audible alarm, or by triggering some other form of communication to the owner, such as placing an indication of the device location on a website accessible by the owner.

Once the portable electronic device has determined or been alerted that it has an undesirable status and has been either misplaced, lost, or stolen, the device can also choose to take the additional following steps to protect its data, either singly or combination, including locking down data retrieval functionality 220, destroying an encryption key 230, or erasing the stored data 240.

In a preferred embodiment, the invention comprises a data protection system for a portable electronic device having an owner. The portable electronic device has data storage, means for determining a status of the portable electronic device, and means for protecting data on the portable electronic device whenever a status of the portable electronic device is undesirable. For present purposes, an "owner" is defined as someone who actually either owns the device or is an authorized user of the device and, hence, entitled to protect the data on the device. This definition of owner is not intended to prescribe or prevent the use of the invention in other circumstances, where use of the device may be temporary, on lease, or otherwise.

In a first version, the means for determining status of the portable electronic device may be external to the portable electronic device. The owner of the device subjectively or objectively determines that the device has an undesirable status. An undesirable status includes being misplaced, lost, or stolen. An undesirable status further includes knowing the location of the device, not having current access to the device, but wishing to prevent access to data on the device by others while it is in the known, but undesirable location. Generally, when the device is in a known but undesirable location, the owner has inadvertently temporarily left the device at a known location such as a restaurant, an airplane, at another person's office, at a friend's house, at a business, or some other similar circumstance.

External status communication may occur via any of at least two methods. The first method consists of an owner making a determination that the portable electronic device has an undesirable status. The owner communicates a status code to the device to indicate the undesirable status, and the device receives the status code from the owner. The second method consists of a service provider determining that the portable electronic device has an undesirable status. The service provider communicates with the device to provide a notice to the device of status, and the device receives the notice.

Alternatively, in another embodiment, the data protection system may use internal means in the portable electronic device for determining status of the device. These means may include any of the following, either singly or in combination: observing a position of the portable electronic device; observing an activity level of the portable electronic device; or observing a dialing pattern of the portable electronic device.

Once the data protection system has used either external or internal means to determine a status of the portable electronic device, various means for protecting data on the device are triggered by the device. These means for protecting data stored on the device include, singly or in combination: (1) the device declaring its own location to its owner or a service provider; (2) the device locking data retrieval functionality; (3) where data is stored in an encrypted format, destroying an encryption key stored in the device to prevent further access to the data; or (4) erasing the data in the device.

A preferred embodiment, of the invention for protecting data in a lost portable electronic device, wherein the data is encrypted with an encryption key stored in the device, comprises the steps of: (1) an owner of the device determining that the device has an undesirable status; (2) the owner calling the device and transmitting a code to the device indicating the undesirable status; (3) the device receiving the code; and (4) the device destroying the stored encryption key, thereby preventing access to the data on the device.

The previously described versions of the invention have many advantages, including simple implementation, flexible methods of implementation, varying levels of security, varying means for notification, automated determination of device status, and universal applicability to any portable electronic device, wireless and otherwise, among other things. The invention does not require that all the advantageous features and all the advantages need to be incorporated into every embodiment of the invention.

Although the invention has been described in considerable detail with reference to certain preferred versions thereof, other versions are possible. For example, in addition to GPS, other forms of device locating technology can be used, such as RFID, WiFi triangulation, microwave or broadcast triangulation, ultrawideband triangulation, and other location and position detection systems that might evolve in the future. Further, other access inhibitors can be triggered upon determination that the device has an undesirable status, such as the requirement for a thumb-print, retinal scan or other bio-identification input. Additionally, such features as power-disconnect, screen blanking, and other interruptions to device functionality may be triggered upon determination that the device has an undesirable status. Additionally, although an undesirable status is described as misplaced, lost, or stolen, the invention may be easily adapted to address other status circumstances, such as presence within certain distrusted wireless networks, presence within certain geographical regions, and any other status circumstances which might be of interest to a user or owner of the device. In addition, although described as having external and internal means for determining status and triggering data protection actions, in additional embodiments, a device can be enabled with any of the described features in an automated fashion, thereby creating a smart implementation which is triggered automatically based upon the device's detection of certain events or activities, as previously described.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for actuating a portable electronic device, the method comprising executing software embodied on the portable electronic device which causes the portable electronic device to perform the steps of:
   receiving dialing patterns entered into the device;
   comparing the received dialing patterns with a history of previously dialed patterns;
   determining a status of the portable electronic device, wherein the status is determined by the portable electronic device, internally, based on the comparison;
   determining a location of the portable electronic device, wherein the location is calculated based on GPS; and
   triggering at least one of a plurality of actions in response to the internally determined status, wherein the at least one of the plurality of actions comprises transmitting the location to a website accessible by an authorized user of the portable electronic device.

2. The method of claim 1, wherein the step of determining the location of the portable electronic device is additionally based on WiFi triangulation.

3. The method of claim 1, further comprising triggering at least two of the plurality of actions, wherein a first action comprises transmitting the location to the website accessible by the authorized user of the portable electronic device, and a second action comprises locking the portable electronic device.

4. The method of claim 1, further comprising triggering at least two of the plurality of actions, wherein a first action comprises transmitting the location to the website accessible by the authorized user of the portable electronic device, and a second action comprises sounding an audible alarm of the portable electronic device.

5. The method of claim 1, further comprising triggering at least two of the plurality of actions, wherein a first action comprises transmitting the location to the website accessible by the authorized user of the portable electronic device, and a second action comprises erasing stored data in the portable electronic device.

6. The method of claim 1, further comprising triggering at least two of the plurality of actions, wherein a first action comprises transmitting the location to the website accessible by the authorized user of the portable electronic device, and a second action comprises destroying an encryption key associated with data of the portable electronic device.

7. The method of claim 1, wherein the internally determined status indicates that the portable electronic device is misplaced, lost, or stolen.

8. The method of claim 1, wherein the step of internally determining the status of the portable electronic device further comprises comparing an elapsed time after a last usage of the portable electronic device to a predetermined threshold value.

9. The method of claim 1, wherein executing software embodied on the portable electronic device comprises causing the portable electronic device to trigger at least three of the plurality of actions in response to the internally determined status.

10. The method of claim 1, wherein the step of determining the location of the portable electronic device is additionally based on RFID.

11. A portable electronic device comprising:
    a processing unit;
    a communications interface;
    a GPS unit; and
    a memory unit operably coupled to the processing unit, the memory unit having instructions stored thereon, which when executed by the processing unit, cause the portable electronic device to:
    receive dialing patterns entered into the device;
    compare the received dialing patterns with a history of previously dialed patterns;
    internally determine a status of the portable electronic device based on the comparison;
    determine a GPS based location of the portable electronic device; and
    trigger at least one of a plurality of actions in response to the portable electronic device internally determining the status, wherein the at least one of the plurality of actions comprises transmitting, the location to a website accessible by an authorized user of the portable electronic device.

12. The portable electronic device of claim 11, wherein the memory unit embodies instructions executable by the processing unit to determine the location of the portable electronic device based on WiFi triangulation in addition to GPS.

13. The portable electronic device of claim 11, wherein the memory unit embodies instructions executable by the processing unit to trigger at least two of the plurality of actions, wherein a first internal protection action comprises transmitting the location to the website accessible by the authorized user of the portable electronic device, and a second action comprises locking of the portable electronic device.

14. The portable electronic device of claim 11, wherein the memory unit embodies instructions executable by the processing unit to trigger at least two of the plurality of actions, wherein a first action comprises transmitting the location to the website accessible by the authorized user of the portable electronic device, and a second action comprises sounding of an audible alarm of the portable electronic device.

15. The portable electronic device of claim 11, further comprising:
   a storage unit configurable to electronically store data on the portable electronic device and the memory unit embodies instructions executable by the processing unit to trigger at least two of the plurality of actions, wherein a first action comprises transmitting the location to the website accessible by the authorized user of the portable electronic device, and a second action comprises erasing of the stored data in the portable electronic device.

16. The portable electronic device of claim 11, further comprising:
   a storage unit configurable to electronically store encrypted data on the portable electronic device and the memory unit embodies instructions executable by the processing unit to trigger at least two of the plurality of actions, wherein a first action comprises transmitting the location to the website accessible by the authorized user of the portable electronic device, and a second action comprises destruction of an encryption key associated with the encrypted data stored on the portable electronic device.

17. The portable electronic device of claim 11, wherein the memory unit further comprises instructions stored thereon, which when executed by the processing unit, causes the portable electronic device to internally determine the status by comparing an elapsed time after a last usage of the portable electronic device to a predetermined threshold value.

18. The portable electronic device of claim 11, wherein the memory unit embodies instructions executable by the processing unit to trigger the portable electronic device to perform at least three of the plurality of actions in response to the portable electronic device internally determining the status.

19. The portable electronic device of claim 11, wherein the memory unit embodies instructions executable by the processing unit to determine the location of the portable electronic device based on RFID in addition to GPS.

20. A portable electronic device comprising:
   means for receiving and monitoring dialing patterns received at the portable electronic device during placed calls;
   means for comparing the dialing patterns and determining an elapsed time between placed calls;
   means for internally determining a status of the portable electronic device based on the determined elapsed time between placed calls;
   means for determining a GPS based location of the portable electronic device;
   means for actuating at least one of a plurality of responses, associated with the internally determined status, wherein the at least one response comprises communicating the determined location to an authorized user of the portable electronic device, via a website which is accessible to the authorized user; and
   means for locking the portable electronic device after communicating the response.

\* \* \* \* \*